US010152596B2

United States Patent
Pieczul

(10) Patent No.: US 10,152,596 B2
(45) Date of Patent: Dec. 11, 2018

(54) DETECTING ANOMALOUS EVENTS THROUGH RUNTIME VERIFICATION OF SOFTWARE EXECUTION USING A BEHAVIORAL MODEL

(71) Applicant: INTERNATIONAL BUSINESS MACHINES CORPORATION, Armonk, NY (US)

(72) Inventor: Olgierd S. Pieczul, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 15/000,192

(22) Filed: Jan. 19, 2016

(65) Prior Publication Data

US 2017/0206354 A1     Jul. 20, 2017

(51) Int. Cl.
    *G06F 21/56* (2013.01)
    *G06F 21/55* (2013.01)
    *G06N 5/04* (2006.01)

(52) U.S. Cl.
    CPC .......... *G06F 21/566* (2013.01); *G06F 21/554* (2013.01); *G06N 5/04* (2013.01); *G06F 2221/033* (2013.01)

(58) Field of Classification Search
    CPC ................ G06F 21/566; G06F 21/554; G06F 2221/033; G06N 5/04
    See application file for complete search history.

(56) References Cited

U.S. PATENT DOCUMENTS

| | | | | |
|---|---|---|---|---|
| 5,440,723 | A * | 8/1995 | Arnold | G06F 21/564 |
| | | | | 714/2 |
| 7,343,624 | B1 * | 3/2008 | Rihn | G06F 21/56 |
| | | | | 713/188 |
| 7,594,260 | B2 | 9/2009 | Porras et al. | |
| 7,639,714 | B2 | 12/2009 | Stolfo et al. | |

(Continued)

FOREIGN PATENT DOCUMENTS

JP     5372956 B2     12/2013

OTHER PUBLICATIONS

Sultana, A. et al., "An Improved Hidden Markov Model for anomaly detection using frequent common patterns", IEEE CC2012, Communication & Info. Sys. Security Symp., pp. 1113-1137 (2012).*

(Continued)

*Primary Examiner* — Luu T Pham
*Assistant Examiner* — James J Wilcox
(74) *Attorney, Agent, or Firm* — Robert C. Bunker

(57) ABSTRACT

Runtime verification of software execution events against a behavioral model. For each event, it is verified whether there is a short range correlation of a sequence of the event and preceding event(s) with the behavioral model, and whether there is a long range correlation of a group of the sequences and of an arrangement of groups of the sequences with the behavioral model. After verifying each long range correlation, the arrangement of groups in the behavioral model event is substituted with an intersection of an arrangement of groups of the sequences with an arrangement of groups of the sequences in the behavioral model. If an event is not covered by a short range correlation or a long range correlation of a group or a long range correlation of an arrangement of groups, the event is indicated as anomalous.

12 Claims, 5 Drawing Sheets

(56) References Cited

U.S. PATENT DOCUMENTS

| | | | |
|---|---|---|---|
| 7,978,711 B2* | 7/2011 | Harrang | H04H 20/42 370/231 |
| 8,225,402 B1* | 7/2012 | Averbuch | G06F 21/554 717/141 |
| 8,271,403 B2 | 9/2012 | Rieck et al. | |
| 8,332,825 B2 | 12/2012 | Mital et al. | |
| 8,381,299 B2 | 2/2013 | Stolfo et al. | |
| 8,448,130 B1* | 5/2013 | Pillarisetti | G06F 8/447 717/104 |
| 8,495,196 B2* | 7/2013 | Harrang | H04W 4/029 709/223 |
| 8,583,820 B2* | 11/2013 | Harrang | H04L 1/0002 709/224 |
| 8,589,508 B2* | 11/2013 | Harrang | H04L 1/0002 709/217 |
| 8,639,797 B1* | 1/2014 | Pan | H04L 43/12 709/223 |
| 8,713,141 B1* | 4/2014 | Liu | H04L 63/1425 709/223 |
| 8,782,434 B1 | 7/2014 | Ghose | |
| 8,887,286 B2 | 11/2014 | Dupont et al. | |
| 8,930,926 B2* | 1/2015 | Bastoul | G06F 8/453 717/119 |
| 9,015,567 B2* | 4/2015 | Peach | H04B 7/18513 714/799 |
| 9,038,184 B1* | 5/2015 | Mann | G06F 21/562 726/24 |
| 9,081,959 B2* | 7/2015 | Ghosh | G06F 21/56 |
| 9,124,528 B2* | 9/2015 | Szabo | H04L 45/46 |
| 9,143,341 B2* | 9/2015 | Harrang | H04L 12/00 |
| 9,191,398 B2* | 11/2015 | Bolzoni | H04L 43/00 |
| 9,195,826 B1* | 11/2015 | Fang | G06F 21/56 |
| 9,195,829 B1* | 11/2015 | Goradia | G06F 11/362 |
| 9,306,965 B1* | 4/2016 | Grossman | H04L 63/1416 |
| 9,329,980 B2* | 5/2016 | Baril | G06F 11/3688 |
| 9,331,774 B2* | 5/2016 | Chen | G08G 3/02 |
| 9,529,690 B2* | 12/2016 | Akiyama | G06F 21/554 |
| 9,569,614 B2 | 2/2017 | Pieczul | |
| 9,591,014 B2 | 3/2017 | Pieczul | |
| 9,652,616 B1* | 5/2017 | Bhatkar | G06F 21/566 |
| 9,672,355 B2* | 6/2017 | Titonis | G06F 21/56 |
| 9,817,884 B2* | 11/2017 | Greifeneder | G06F 17/30598 |
| 9,817,971 B2* | 11/2017 | Peleg | G06F 21/554 |
| 9,842,206 B2* | 12/2017 | Peleg | G06F 21/52 |
| 9,858,053 B2* | 1/2018 | Lethin | G06F 8/443 |
| 9,900,332 B2* | 2/2018 | Muddu | G06N 99/005 |
| 2003/0172288 A1* | 9/2003 | Sasage | G06F 21/554 726/16 |
| 2005/0063406 A1* | 3/2005 | Pieczul | H04L 69/22 370/428 |
| 2006/0150256 A1* | 7/2006 | Fanton | G06F 21/10 726/27 |
| 2008/0127046 A1* | 5/2008 | Mitchell | G06F 11/3612 717/104 |
| 2009/0193293 A1* | 7/2009 | Stolfo | G06F 21/564 714/26 |
| 2009/0313699 A1* | 12/2009 | Jang | G06F 21/52 726/23 |
| 2010/0070805 A1* | 3/2010 | Chang | G06F 11/3636 714/39 |
| 2012/0137367 A1 | 5/2012 | Dupont et al. | |
| 2012/0159446 A1* | 6/2012 | Jentsch | G06F 9/44 717/124 |
| 2012/0260344 A1 | 10/2012 | Maor et al. | |
| 2012/0265784 A1 | 10/2012 | Hsu et al. | |
| 2012/0324575 A1* | 12/2012 | Choi | G06F 21/554 726/23 |
| 2013/0097706 A1* | 4/2013 | Titonis | G06F 21/56 726/24 |
| 2013/0326625 A1* | 12/2013 | Anderson | G06F 21/56 726/23 |
| 2014/0096249 A1 | 4/2014 | Dupont et al. | |
| 2014/0279747 A1 | 9/2014 | Strassner | |
| 2015/0172300 A1 | 6/2015 | Cochenour | |
| 2015/0193617 A1* | 7/2015 | Kawauchi | G06F 21/56 726/22 |
| 2015/0254151 A1* | 9/2015 | Baril | G06F 11/3003 702/182 |
| 2015/0254161 A1* | 9/2015 | Baril | G06F 11/3616 717/124 |
| 2015/0254162 A1* | 9/2015 | Baril | G06F 11/3636 717/128 |
| 2015/0254163 A1* | 9/2015 | Baril | G06F 11/3636 714/38.1 |
| 2015/0254165 A1* | 9/2015 | Baril | G06F 11/3676 714/38.1 |
| 2015/0254172 A1* | 9/2015 | Baril | G06F 11/3688 717/128 |
| 2015/0350235 A1* | 12/2015 | Kim | H04L 63/1433 726/25 |
| 2016/0055426 A1* | 2/2016 | Aminzadeh | G06N 99/005 706/12 |
| 2016/0080476 A1* | 3/2016 | Sandell | H04W 4/21 709/204 |
| 2016/0232347 A1* | 8/2016 | Badishi | G06F 21/54 |
| 2016/0239587 A1 | 8/2016 | Pieczul | |
| 2016/0239596 A1* | 8/2016 | Pieczul | G06Q 30/02 |
| 2016/0253437 A1* | 9/2016 | Platzer | G06F 17/504 703/13 |
| 2017/0061001 A1* | 3/2017 | Tonkin | G06F 17/30672 |
| 2017/0076116 A1* | 3/2017 | Chen | G06F 21/85 |
| 2017/0109515 A1* | 4/2017 | Aharoni | G06F 21/36 |
| 2017/0169208 A1* | 6/2017 | Jantz | G06F 21/44 |
| 2017/0277889 A1* | 9/2017 | Stolfo | G06F 21/564 |
| 2018/0013772 A1* | 1/2018 | Schmidtler | H04L 63/1416 |
| 2018/0025157 A1* | 1/2018 | Titonis | G06F 21/56 |
| 2018/0039908 A1* | 2/2018 | Wang | G06N 99/005 |
| 2018/0054452 A1* | 2/2018 | Muddu | G06N 99/005 |
| 2018/0069888 A1* | 3/2018 | Muddu | H04L 63/1425 |

OTHER PUBLICATIONS

Zolotukhin, M. & Hamalainen, T., "Detection of Zero-day Malware Based on the Analysis of Opcode Sequences", 11th Annual IEEE CCNC Security Privacy & Content Protection, pp. 386-391 (2014).*

Warrender et al., "Detecting Intrusions Using System Calls: Alternative Data Models", Proceedings IEEE Symposium on Security and Privacy, 1999, pp. 133-145, DOI: 10.1109/SECPRI.1999.766910.*

Hamid et al "Detection and Explanation of Anomalous Activites: Representing Activities as Bags of Events n-Grams," College of Cumputing—GVC Center.*

Pieczul et al., "Collaborating as Normal: Detecting Systemic Anomalies in Your Partner," Lecture Notes in Computer Science, vol. 8809, 2014, pp. 18-27.

Pieczul et al., "The dark side of the code," International Workshop on Security Protocols, 2015, pp. 1-12.

Pieczul et al., "I'm OK, you're OK, the system's OK: Normative security for systems," NSPW '14, Sep. 15-18, 2014, Victoria, BC, Canada, pp. 1-10.

Pieczul et al., "Discovering Emergent Norms in Security Logs," 6th Symposium on Security Analytics and Automation, 2013, pp. 438-445.

Goldsby et al., "AMOEBA-RT: Run Time Verification of Adaptive Software," H. Giese (Ed.): MoDELS 2007 Workshops, LNCS 5002, 2008, pp. 212-224, Copyright Springer-Verlag Berlin Heidelberg 2008.

Mocci et al., "Detecting component changes at run time with behavior models," Computing, Mar. 2013, vol. 95, Issue 3, pp. 191-221, Copyright Springer-Verlag 2012.

Hiraishi et al., "Behavior Modeling in Physical and Adaptive Intelligent Services," 2014, IEEE International Inter-Disciplinary Conference on Cognitive Methods in Situation Awareness and Decision Support (CogSIMA), 2014, pp. 244-249.

Xu et al., "Efficient Summarization Framework for Multi-Attribute Uncertain Data," SIGMOD '14, Jun. 22-27, 2014, Snowbird, UT, USA, pp. 1-12.

(56) References Cited

OTHER PUBLICATIONS

Zolotukhin et al., Online Anomaly Detection by Using N-gram Model and Growing Hierarchical Self-Organizing Maps, Wireless Communications and Mobile Computing Conference (IWCMC), 2012 8th International, Aug. 27-31, 2012, pp. 47-52.
Mao et al., "Web Mimicry Attack Detection Using HTTP Token Causal Correlation," International Journal of Innovative Computing, Information and Control, vol. 7, No. 7(B), Jul. 2011, pp. 4347-4362.
Forrest et al., "A Sense of Self for Unix Processes", Proceedings 1996 IEEE Symposium on Security and Privacy, May 6-8, 1996, Oakland, CA, pp. 120-128, DOI: 10.1109/SECPRI.1996.502675.
Forrest et al., "The Evolution of System-Call Monitoring", 2008 Annual Computer Security Applications Conference, ACSAC 2008, pp. 418-430, DOI: 10.1109/ACSAC.2008.54, 2008.
Parekh et al., "Privacy-Preserving Payload-Based Correlation for Accurate Malicious Traffic Detection", Department of Computer Science Columbia University, provided in search report dated Sep. 10, 2014, < http://www.cs.columbia.edu/~janak/research/2182177792Isad.pdf>.
Raman, Preeti, "JaSPIn: JavaScript based Anomaly Detection of Cross-site scripting attacks" (Thesis), Carleton Ottawa, Ontario, Sep. 2008, pp. i-99, © Copyright by Preeti Raman, 2008.
Wagner et al., "Mimicry Attacks on Host-Based Intrusion Detection Systems", (This research was supported in part by NSF Career CCR-0093337), CCS'02, Nov. 18-22, 2002, Washington, DC, USA, Copyright 2002 ACM 1-58113-612-9/02/011.
Wang et al., "Anagram: A Content Anomaly Detector Resistant to Mimicry Attack1", (1 This work has been partially supported by a grant with the Army Research Office, No. DA W911NF-04-0442, provided in search report dated Sep. 10, 2014, <http://www.covert.io/research-papers/security/Anagram%20-%20A%20Content%20Anomaly%20Detector%20Resistant%20to%20Mimicry%20Attack.pdf>.
"n-gram", Wikipedia, the free encyclopedia, this page was last modified on Dec. 11, 2014, printed on Jan. 23, 2015, <http://en.wikipedia.org/wiki/N-gram>.
3IECZUL et al., "Runtime Detection of Zero-Day Vulnerability Exploits in Contemporary Software Systems," DBSec 2016: Data and Applications Security and Privacy Xxx, Jul. 18-20, 2016, pg. 347-363, Lncs 9766, Springer, Cham, Trento, Italy.

\* cited by examiner

DETECTING ANOMALOUS EVENTS THROUGH RUNTIME VERIFICATION OF SOFTWARE EXECUTION USING A BEHAVIORAL MODEL

BACKGROUND

The present disclosure relates to computer system security, and more specifically to detecting anomalies through runtime verification of software execution using a behavioral model.

Anomaly detection is the detection of anomalous behavior in the context of a normal model built using past activity. In security, anomaly detection is a technique of comparing new activity with known "normal" activity patterns. Usually, normal activity is learned from past computer system operation. Various techniques differ by model of normal behavior they use. Current models representing computer system behavior are typically either very simple and of limited precision, or are very complex and large.

N-grams are useful in implementing approximate system matching. It has been shown that n-gram models can be used to implement anomaly detection. For example, an n-gram model may be built from a trace of system calls as representing system's normal behavior. This model records short-range correlations between system calls under normal operation.

A model of system behavior as a single database of n-grams can be rather coarse-grained. While the system may run a number of distinct processes, only a single amalgamated behavior of the entire system is typically captured. This reduces the anomaly detection system's accuracy, as any input sequence is matched to all of known sub-sequences, regardless of whether they ever appear in this arrangement. It has been demonstrated that this weakness can be exploited to bypass the anomaly detection system. An attacker may craft a malicious sequence that, when decomposed, contains only known n-grams. Such a mimicry attack, may be difficult to exploit, as the attacker must know n-grams that have been used to model the particular system's behavior and encode a malicious sequence from them. However, for a large system, such databases can be very large. This large selection of n-grams may simplify the task of identifying a known n-gram.

Operation sequence behavior models can be used to detect the appearance of a previously unknown sequence of actions. Operation sequence behavior models can detect foreign code execution due to attacks such as buffer overflow or cross-site scripting. However, these models typically cannot be used to detect anomalies that do not manifest themselves by the appearance of an unknown sequence. For example, a typical sequence for a business transaction may contain a segment representing execution of a security mechanism. An attack may manifest by a sequence in which this segment is missing. Such a sequence may be accepted as it does not introduce anything unknown.

Another limitation of operation sequence behavior models is using only a single action attribute, which is often not enough to accurately represent a system's behavior. For example, a system may have a policy which requires that certain actions are executed by different users to ensure separation of duties. Without including other attributes in the model, it may not be possible to capture this policy and detect any violations.

Recent anomaly detection systems operate by detecting behavioral norms, such as repeating patterns of behavior identified from system logs. For example, a log trace may be partitioned into a number of sub-traces, or "strands", identified as executions of a transaction-like process. The resulting behavioral model includes multiple distinct n-gram models for each of the strands. This approach may allow for building a more precise model. However, the model size is related to the number of stands used for learning process, and can be quite large. A large model may not be practical.

U.S. Pat. No. 8,225,402 discloses anomaly-based detection of SQL injection attacks. A method for detecting a SQL injection attack includes a training phase and a detection phase. In the training phase, a plurality of SQL queries is transformed into a respective plurality of SQL token domain queries which are processed using a n-gram analysis to provide a threshold and an averaging vector. In the detection phase, each newly arrived SQL query is transformed into a new SQL token domain query, and the n-gram analysis is applied together with the averaging vector and the threshold to each new SQL token domain query to determine if the new SQL query is normal or abnormal. The detection may be online or offline.

SUMMARY

Embodiments of the invention provide a method that, for each the event of a software execution comprising events, it is verified whether the event is covered by a short range correlation of a sequence of the event and one or more events preceding the event with a sequence of two or more events in the behavioral model. It is then verified whether the event is covered by a long range correlation of a group of the sequences with a group of the sequences in the behavioral model. It is then verified whether the event is covered by a long range correlation of an arrangement of groups of the sequences with an arrangement of groups of the sequences in the behavioral model. After verifying each long range correlation, the arrangement of groups of the sequences in the behavioral model event is substituted with an intersection of an arrangement of groups of the sequences with an arrangement of groups of the sequences in the behavioral model. Responsive to the event not being covered by at least one of the short range correlation, the long range correlation of a group of the sequences, or the long range correlation of an arrangement of groups, the event is indicated as anomalous. This provides the advantage of validating behavior of an application against a behavioral model using a small number of resources and with good performance. This is achieved by not checking groups which have already been processed and by checking against a number of acceptable arrangements that shrinks with time.

In another aspect, software execution is halted before execution of an event that is indicated as anomalous. This has the advantage of preventing execution of anomalous software.

In another aspect, processing of events continues after an event is indicated as anomalous, and the software execution is halted after a threshold number of anomalous events is reached. This has the advantage that it is more tolerant of variations in the software being executed and may cause fewer false anomalies to be indicated.

In another aspect, the short range correlation of a sequence of events utilizes tri-grams generated from the sequence of events. This has the advantages of higher performance and simplicity of implementation.

In another aspect, short range correlation of a sequence of events utilizes tri-grams and bi-grams. This has the advantage of allowing validation when fewer events have been received, but also of more thorough validation when sufficient events have been received.

Embodiments of the invention also provide a system that includes one or more computer processors, and one or more computer-readable storage media. A system log for recording events generated by the software execution is stored on the one or more computer-readable storage media. A behavioral model, stored on the one or more computer-readable storage media, includes one or more n-grams of acceptable short range correlations of a sequence of two or more events, one or more groups of acceptable combinations of n-grams and one or more group arrangements of acceptable combinations of groups. A short range event correlator module is stored on the one or more computer-readable storage media which, when executed by the one or more processors, verifies whether each event is covered by a short range correlation of a sequence of the event and one or more events preceding the event with a sequence of two or more events in the behavioral model, and, responsive to each the event not being covered by a short range correlation, indicates that the event is anomalous. A long range correlator module is stored on the one or more computer-readable storage media which, when executed by the one or more processors, verifies whether each event is covered by a long range correlation of a group of the sequences with a group of the sequences in the behavioral model, and verifies whether each event is covered by a long range correlation of an arrangement of groups of the sequences with an arrangement of groups of the sequences in the behavioral model. Responsive to each event not being covered by at least one of the long range correlations, the long range correlator module indicates that the event is anomalous. A transaction arrangement substitutor module is stored on the one or more computer-readable storage media which, when executed by the one or more processors, substitutes, after verifying a long range correlation, the arrangement of groups of the sequences in the behavioral model event with an intersection of an arrangement of groups of the sequences with an arrangement of groups of the sequences in the behavioral model.

BRIEF DESCRIPTION OF THE DRAWINGS

Embodiments of the present invention will now be described in more detail, by way of example only, with reference to the accompanying drawings, in which.

DETAILED DESCRIPTION

Embodiments of the present invention generally address and solve the above identified problems by representing a software behavioral model and current execution context in a memory-efficient data structure, and providing efficient runtime verification of individual system execution events against the model, including the current execution context containing events observed so far, with high accuracy and minimal processing overhead.

System logs of software execution events may be used to discover emerging behaviors in software executing on computer systems. Analyzing behaviors may provide a richer view of software execution activities than typical software execution event-centric approaches. Behavior models, in accordance with embodiments of the invention, capture both short range and long range correlations between elements of a software execution event sequence and logged events of a software execution, using an n-gram analysis of the logged events of a software execution.

Compared with typical n-gram based models, behavior models, in accordance with embodiments of the invention, may be more resistant to mimicry attacks. The behavior models may also allow for detecting more types of anomalies. For example, in addition to detecting previously unknown event sequences, the models may allow for detection of n-gram sequences that are missing but existed in the model's training data. Such behavior models can be easier to build and very rich and precise, but require less memory and allow for faster detection of anomalous events than typical n-gram based models.

Figure 1:
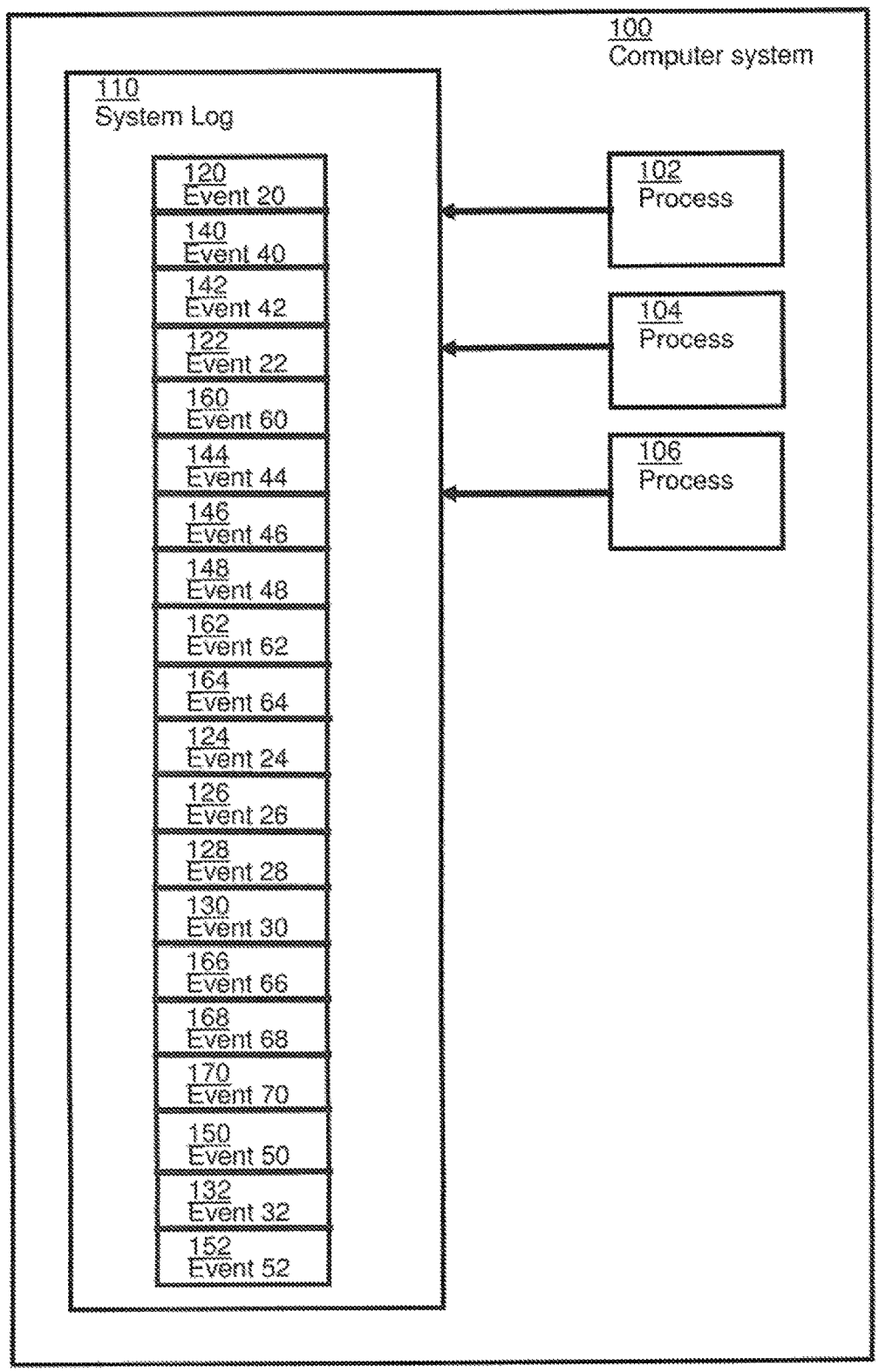
FIG. 1 is a block diagram of a computer system having a plurality of processes which generate strands of events which are stored in a system log, in accordance with an embodiment of the invention.

FIG. 1 shows a computer system 100 having a plurality of processes 102, 104, 106 which generate strands of events 120-132, 140-152, 160-170 which are stored in a conventional system log 110. System log 110 data is a useful source of information for monitoring security violations and identifying incidents. System log 110 records a sequence of system and/or application events 120-132, 140-152, 160-170 in chronological order. Processes 102, 104, 106 may be any combination of system processes or application processes. Any number of processes may be present in the computer system 100, there typically being many more than the three shown. Similarly, there will typically be a much larger number of events 120-132, 140-152, 160-170, but only a small number of events are shown for clarity. In the example used to describe embodiments of the invention, event 20 120, event 22 122, event 24 124, event 26 126, event 28 128, event 30 130 and event 32 132 have been generated by process 102, event 40 140, event 42 142, event 44 144, event 46 146, event 48 148, event 50 150 and event 52 152 have been generated by process 104 and event 60 160, event 62 162, event 64 164, event 66 166, event 68 168 and event 70 170 have been generated by process 106. Each of events 120-132, events 140-152 and events 160-170 form a strand of events.

The strands of events 120-132, 140-152, 160-170 from the system log 110 are used to generate a behavioral model by performing n-gram analysis on the strands, followed by classifying the n-grams into groups of n-grams and the groups of n-grams into arrangements of groups. A group of n-grams includes one or more n-grams which, when seen together in combination, are typical of normal behavior. An arrangement of groups includes two or more groups of n-grams which, when seen together in combination, are typical of normal behavior.

One example of a possible method of generating a behavioral model of n-grams, groups and arrangements from a set of traces will now be described. Any other method may be used in embodiments of the present invention and the described method is purely exemplary and not limiting. Software to be executed is compared to the generated behavioral model to determine whether the software is normal and should be executed or whether the software is anomalous and an action, other than simple execution, should be taken. The described example is based on traces which may be generated with the following C-like program:

```
...
if (access(input) != OK) exit;
in = open(input);
while (not_end(input)) {
    buffer = read(input)
    write(buffer, stdout);
}
close(input)
...
```

Executing code, such as that above, and monitoring the execution through a monitoring tool may result in sets of traces such as, for example, the following:

```
access "/home/joe/a"
open "/home/joe/a"
read fd1
close fd1
access "/tmp/b"
open "/tmp/b"
read fd1
close fd1
access "/tmp/c"
open "/tmp/c"
read fd1
write stdout
close fd1
access "/root/.plan"
open "/root/.plan"
read fd1
write stdout
close fd1
access "/etc/hosts"
open "/etc/hosts"
read fd1
write stdout
read fd1
write stdout
read fd1
write stdout
close fd1
access "/etc/fstab"
open "/etc/fstab"
read fd1
write stdout
read fd1
write stdout
close fd1
access "/dev/null"
open "/dev/null"
read fd1
close fd1
access "/home/jim/long"
open "/home/jim/long"
read fd1
write stdout
read fd1
write stdout
read fd1
write stdout
read fd1
write stdout
read fd1
write stdout
read fd1
write stdout
read fd1
write stdout
read fd1
write stdout
close fd1
```

This list of sets of traces is purely exemplary and is not complete. There may be many more traces, for example, with read/write sequence repeated hundreds of times for a large file. The exemplary traces are provided simply to give an idea of how the sequences may vary. The point of generating the behavioral model is not to capture exact traces, such as traces with particular attributes or particular number of repetitions, but to capture the behavior of the program.

For every event in a thread, such as, for example, a method call, it is first verified whether the incoming event matches a known short range correlation of a sequence of the last few events, that is, an n-gram, the number of events in the sequence depending on the n-gram size being used. If the incoming event does not match a known short range correlation of a sequence of the last few events, then, in an embodiment, the transaction may be flagged as anomalous without further checking being done. The group in which an n-gram appears in the behavioral model are checked against a set of already processed groups. If the group in which the n-gram appears has already been seen in the transaction, then the event is accepted and the next event can be processed. The set of already processed groups grows over time and so as time goes on, more and more events will be in groups which have already been seen in transactions and so less processing will be required, improving performance over time. The set of arrangements in which the group appears in the behavioral model and the set of arrangements seen so far in the transaction are compared. If there is no intersection between these sets, then the transaction is flagged as anomalous. The set of arrangements seen so far in the transaction will shrink over time, again improving performance over time.

In the examples described below, each n-gram is a tri-gram, which is a consecutive sequence of three items from the input events 120-132, 140-152, or a bi-gram, which is a consecutive sequence of two items from the input events 160-170. In other embodiments, other n-grams can be used, including using n-grams of different sizes to perform runtime verification of the same events. Groups and group arrangements can be created from the tri-grams and the bi-grams. Tri-grams and bi-grams are selected as purely exemplary examples of n-grams and other n-grams or combinations of n-grams may be used.

Figure 2A:
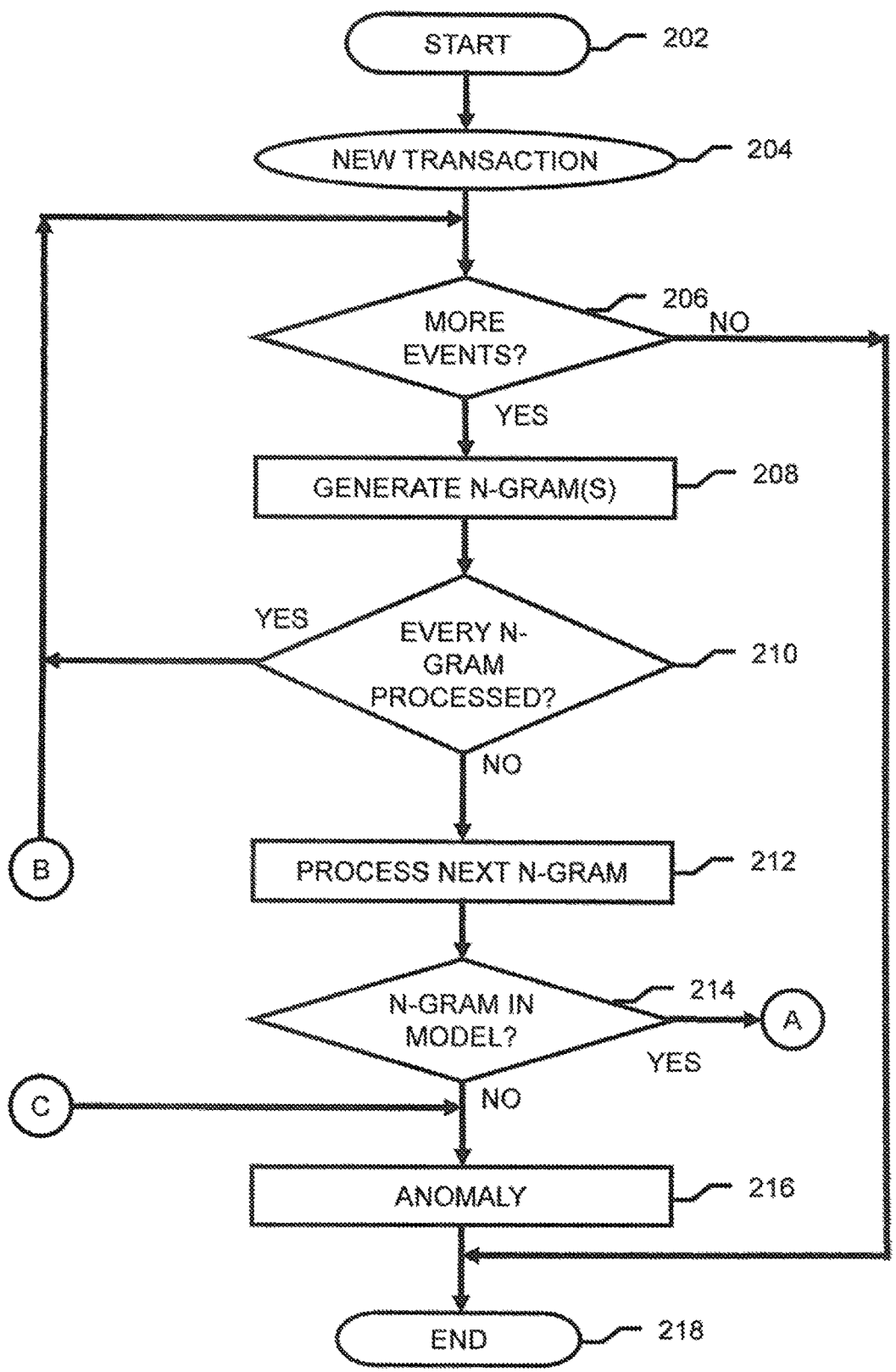
FIGS. 2A and 2B are a flow chart of a method of runtime verification of software execution, in accordance with an embodiment of the invention.

FIG. 2A shows a flow chart of an embodiment of a method of runtime verification of software execution, in accordance with an embodiment of the present invention. FIG. 2A together with FIG. 2B forms FIG. 2. The method starts at step 202. At step 204, a new transaction including one or more events 120-132, 140-152, 160-170 is received.

In the following description a single iteration for the three events 120-124 of the first example will be described in detail. After the description of FIGS. 2A and 2B, the processing of each one of the other events 126-132 of the first example will be briefly described. In the first example, each of the n-grams is a known n-gram and the groups associated with the n-grams do appear together in a known arrangement and so the transaction is accepted. Then the processing of the events 140-152 of the second example and the events 160-170 of the third example will be briefly described. In the second example, the first n-gram is not a known n-gram and so the transaction is found to be anomalous. In the third example, the groups associated with the n-grams do not appear together in any known arrangement and so the transaction is found to be anomalous.

At step 206, a check is made as to whether there are any more events to be processed. If there are no more events 120-132, 140-152, 160-170 to be processed, then processing proceeds to step 218. Processing finishes at step 218. If there are more events 120-132, 140-152, 160-170 to be processed, then processing proceeds to step 208.

In order to describe the operation of the embodiment of FIG. 2, a first example sequence of seven events 120-132 on which it is desired to carry out runtime verification will be used. The operation will also be briefly described with respect to a second example sequence of seven events 140-152 and a third example sequence of events 160-170, in both examples of which it is desired to carry out runtime verification. The three example sequences of events are:

First Example

| | |
|---|---|
| 120 | access "/etc/fstab" |
| 122 | open "/etc/fstab" |
| 124 | read fd1 |
| 126 | write stdout |
| 128 | read fd1 |
| 130 | write stdout |
| 132 | close fd1 |

Second Example

| | |
|---|---|
| 140 | access "/home/olgierd/foo" |
| 142 | open "/etc/shadow" |
| 144 | read fd1 |
| 146 | write stdout |
| 148 | read fd1 |
| 150 | write stdout |
| 152 | close fd1 |

Third Example

| | |
|---|---|
| 160 | access "/etc/hosts" |
| 162 | open "/etc/hosts" |
| 164 | read fd1 |
| 166 | write stdout |
| 168 | read fd1 |
| 170 | close fd1 |

At step 208, in an embodiment, an n-gram is generated from the events 120-132. Events 120-124 result in an n-gram of "access.a1, open.a1, read.a2" being generated. a1 and a2 represent first and second attributes associated with the first 120, second 122, and third 124 events. If the attributes for each of the events were different, they would be assigned the different representations. If the attribute for two or more of the events are the same, such as the first event 120 and the second event 122 above, they are assigned the same representation. At step 210, a check is made as to whether every n-gram has been processed. If every n-gram has been processed, then processing returns to step 206 to check for more events. If there are more n-grams to process, then processing proceeds to step 212.

In an embodiment, at step 208, when the first event 120 is received, there are not enough events to build a tri-gram. When the second event 122 is received, there are still not enough events to build a tri-gram. When the third event 124 is received, there are now enough events to build a trigram using the first, second and third events. The tri-gram is then processed as described below. If the tri-gram does not result in an anomaly and processing being stopped, then in response to receipt of the fourth event 126, a further tri-gram is built using the second, third and fourth events. That tri-gram is also processed as described below.

In another embodiment, at step 208, when the first event 120 is received, there are not enough events to build a tri-gram. When the second event 122 is received, there are still not enough events to build a tri-gram, but there are enough events to build a bi-gram. When the third event 124 is received, there are now enough events to build a trigram using the first, second and third events and also to build a bi-gram using the second and third events. In response to receipt of the third event 124, the tri-gram and the bi-gram are processed as described below. If the bi-gram or the tri-gram does not result in an anomaly and processing being stopped, then in response to receipt of the fourth event 126, a further trigram is built using the second, third and fourth events and a bi-gram is built using the third and fourth events. That tri-gram and that bi-gram are also processed as described below. In the following description, the processing of only a tri-gram for the first and second examples and only a bi-gram for the third example are described for simplicity and clarity. However, at each stage of processing a tri-gram or a bi-gram, optionally, both a bi-gram and a tri-gram may be processed. In other embodiments n-grams of any other size, alone or in combination with an n-gram of another size may be used. In yet further embodiments, more than two sizes of n-grams may be processed for the same events 120-132.

At step 212, the next n-gram is processed by moving to the next n-gram and continuing to step 214.

At step 214, a check is made for short range correlation by checking whether the n-gram for the current event is in the behavioral model. If the n-gram for the current event is in the behavioral model, then processing moves on to check long range correlation by checking whether the group or groups in which the n-gram appears are known in this transaction. If the n-gram for the current event is not in the behavioral model, then the event is considered anomalous.

In order to describe the operation of the embodiment of FIG. 2 using a first example set of events 120-132 and a second example set of events 140-152, a first example behavioral model of six n-grams (tri-grams) will be used. The operation will also be briefly described using a third example set of events 160-170, with respect to a second example behavioral model of six n-grams (bi-grams). The two example behavioral models are:

First Behavioral Model for First and Second Examples

N1: access.a1, open.a1, read.a2
N2: open.a1, read.a2, close.a2
N3: open.a1, read.a2, write.a3
N4: read.a1, write.a2, close.a1
N5: read.a1, write.a2, read.a1
N6: write.a1, read.a2, write.a1

Second Behavioral Model for Third Example

N1: access.a1, open.a1
N2: open.a1, read.a2
N3: read.a1, close.a1
N4: read.a1, write.a2
N5: write.a1, read.a1
N6: write.a1, close.a2

As explained above, with reference to step 208, events 120-124 result in an n-gram of "access.a1, open.a1, read.a2"

being generated. This corresponds to n-gram N1 in the first behavioral model and so at step 214 this n-gram is in the behavioral model. If the n-gram was not in the behavioral model, then processing proceeds to step 216. At step 216, the event was not in the behavioral model and so is considered anomalous. The anomaly may be flagged. Processing ends at step 218. As the n-gram resulting from events 120-124 is in the behavioral model (N1), processing continues to step 220 in FIG. 2B.

Figure 2B:
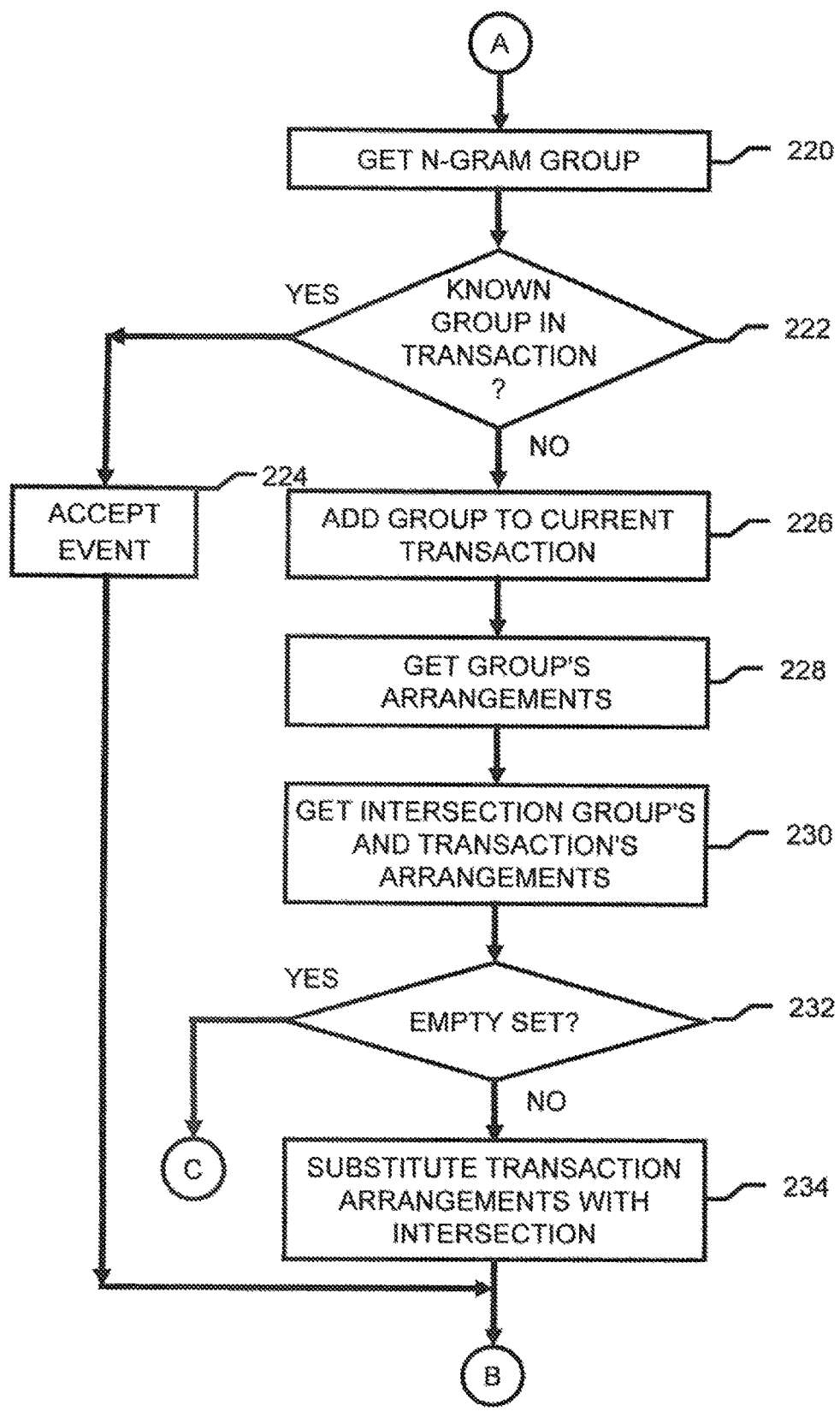

Referring to FIG. 2B, at step 220, the group of which the n-gram is a member is obtained. The first behavioral model includes the following groups of n-grams, in this case, tri-grams, identified by n-gram analysis on previous acceptable transactions:

G1: N1
G2: N2
G3: N3, N4
G4: N5, N6

The second behavioral model also comprises the following groups of n-grams, in this case, bi-grams, identified by n-gram analysis on previous acceptable transactions:

G1: N1, N2
G2: N3
G3: N4, N6
G4: N5

In this example, n-gram N1 is in group G1, which includes only the n-gram N1. In order to improve performance, instead of checking arrangements for that group, a check is first made as to whether the group was already processed for that transaction, and if so, it is not necessary to check group arrangements and the event is accepted. If the group was not previously seen for current transaction, the method adds it to the set and verifies arrangements.

At step 222, a check is made as to whether the group is already known for this transaction. If the group is already known for this transaction, that is, if the combination of n-grams which make up the group have already been seen, then processing continues at step 224. If the group is not already known for this transaction, that is, if the combination of n-grams which make up the group have not already been seen, then processing continues at step 226.

At step 224, the event is accepted and processing continues to step 206 in FIG. 2A to check if there are more events to be processed. If the group (G1 is this instance) is not already known for this transaction, that is, if the combination of n-grams which make up the group have not already been seen, then processing continues to step 226. As this n-gram and group are the first n-gram, then the combination of n-grams which make up the group have not already been seen.

At step 226, the group (in this instance group G1) is added to the current transaction. At step 228, the group's arrangements are obtained.

The first behavioral model includes the following arrangements of groups of n-grams, in this case, tri-grams, identified by n-gram analysis on previous acceptable transactions:

A1: G1, G2
A2: G1, G3
A3: G1, G3, G4

The second behavioral model includes the following arrangements of groups of n-grams, in this case, bi-grams, identified by n-gram analysis on previous acceptable transactions:

A1: G1, G2
A2: G1, G3
A3: G1, G3, G4

A check will be made as to whether the group's arrangement set and current transaction's arrangements set have any common elements, that is, whether there is an acceptable arrangement for current event/n-gram in the context of previously processed events. If there is, then that new reduced set of arrangements, that is, the intersection of both the group's arrangement set and current transaction's arrangements set becomes the new set, effectively limiting the scope for subsequent events. In this instance, the arrangements are A1, A2, and A3. On the first pass through the checking, all arrangements (A1, A2, and A3) in the behavioral model are identified as possible arrangements. At step 230, the intersection between the group's arrangements (in this instance A1, A2, and A3) and the transaction's arrangements (in this instance A1, A2, and A3) is obtained. At step 232, a check is made as to whether the intersection is an empty set, that is, whether no arrangements are common to both the group's arrangements and the transaction's arrangements. If there is no intersection, that is, the intersection between the group's arrangements and the transaction's arrangement is an empty set, then processing proceeds to step 216 in FIG. 2A. Referring briefly to FIG. 2A, at step 216, as there was no intersection between the group's arrangements and the transaction's arrangements, an anomaly is identified and processing finishes at step 218. Returning to FIG. 2B, if there is an intersection, then processing proceeds to step 234.

At step 234, the transaction arrangements are substituted with the arrangements present in the intersection between the group's arrangements and the transaction's arrangements. Processing continues at step 206 in FIG. 2A to check if there are more events to be processed.

The processing of each one of the events 120-132 of the first example will now be briefly described. At step 214, the n-gram generated from events 120, 122, 124 is present in the model as n-gram N1. So the n-gram is not considered as anomalous at this step. At step 222, the group G1, which includes n-gram N1, is not a known group in this transaction. So, the arrangements for that group need checking. At this stage, the possible arrangements for the group G1 comprise A1, A2, and A3, as each of these arrangements includes group G1. At step 232, the group's arrangements (A1, A2, and A3) and the transaction's arrangements (A1, A2, and A3) overlap and so the intersection is not an empty set. At step 234, the transaction's arrangements are substituted with A1, A2, and A3.

The next event 126 is now considered at step 206. At step 214, the n-gram generated from events 122, 124, 126 is present in the model as n-gram N3. So the n-gram is not considered as anomalous at this step. At step 222, the group G3, which includes n-grams N3 and N4, is not a known group in this transaction. So, the arrangements for that group need checking. At this stage, the possible arrangements for the group G3 include A2 and A3, as each of these arrangements includes group G3. At step 232, the group's arrangements (A2 and A3) and the transaction's arrangements (A2 and A3) overlap and so the intersection is not an empty set. At step 234, the transaction's arrangements are substituted with A2 and A3.

The next event 128 is now considered at step 206. At step 214, the n-gram generated from events 124, 126, 128 is present in the model as n-gram N5. So the n-gram is not considered as anomalous at this step. At step 222, the group G4, which includes n-grams N5 and N6, is not a known group in this transaction. So, the arrangements for that group need checking. At this stage, the possible arrangements for the group G4 include A3, as only this arrangement includes group G4. At step 232, the group's arrangements (A3) and the transaction's arrangements (A3) overlap and so the intersection is not an empty set. At step 234, the transaction's arrangements are substituted with A3.

The next event 130 is now considered at step 206. At step 214, the n-gram generated from events 126, 128, 130 is present in the model as n-gram N6. So the n-gram is not considered as anomalous at this step. At step 222, the group G4, which includes N5 and N6, is a known group in this transaction. So, the arrangements for that group do not need checking. At step 224, the event is accepted.

The next event 132 is now considered at step 206. At step 214, the n-gram generated from events 128, 130, 132 is present in the model as n-gram N4. So the n-gram is not considered as anomalous at this step. At step 222, the group G3, which includes N3 and N4, is a known group in this transaction. So, the arrangements for that group do not need checking. At step 224, the event is accepted.

The processing of each one of the events 140-152 of the second example will now be briefly described. The event 144 is now considered at step 206. At step 214, the n-gram generated from events 140, 142, 144 is not present in the model as a known n-gram. So the n-gram is considered as anomalous at this step. At step 216, as the n-gram is not a known n-gram, an anomaly is identified and processing finishes at step 218.

In an exemplary embodiment, processing of the transaction is halted before execution of the event that results in the anomaly being identified. In another embodiment, processing of the remaining n-grams continues as described for the first example above, with the anomaly being recorded. In a variation of this embodiment, the anomaly is recorded, and, after a threshold of anomalies is reached, execution is interrupted. Many other variations of continued execution after identifying an anomaly are possible.

The processing of each one of the events 160-170 of the third example will now be briefly described. The third example uses bi-grams instead of tri-grams. The next event 162 is considered at step 206. At step 214, the n-gram generated from events 160, 162 is present in the model as n-gram N1. So the n-gram is not considered as anomalous at this step. At step 222, the group G1, which includes n-grams N1 and N2, is not a known group in this transaction. So, the arrangements for that group need checking. At this stage, the possible arrangements for the group G1 include A1, A2, and A3, as each of these arrangements includes group G1. At step 232, the group's arrangements (A1, A2, and A3) and the transaction's arrangements (A1, A2, and A3) overlap and so the intersection is not an empty set. At step 234, the transaction's arrangements are substituted with A1, A2, and A3.

The next event 164 is now considered at step 206. At step 214, the n-gram generated from events 162, 164 is present in the model as n-gram N2. So the n-gram is not considered as anomalous at this step. At step 222, the group G1, which includes N1 and N2, is a known group in this transaction. So, the arrangements for that group do not need checking. At step 224, the event is accepted.

The next event 166 is now considered at step 206. At step 214, the n-gram generated from events 164, 166 is present in the model as n-gram N4. So the n-gram is not considered as anomalous at this step. At step 222, the group G3, which includes N4 and N6, is not a known group in this transaction. So, the arrangements for that group need checking. At this stage, the possible arrangements for the group G3 include A2 and A3, as each of these arrangements includes group G3. At step 232, the group's arrangements (A2 and A3) and the transaction's arrangements (A2 and A3) overlap and so the intersection is not an empty set. The transaction's arrangements are substituted with A2 and A3.

The next event 168 is now considered at step 206. At step 214, the n-gram generated from events 166, 168 is present in the model as n-gram N5. So the n-gram is not considered as anomalous at this step. At step 222, the group G4, which includes only N5, is not a known group in this transaction. So, the arrangements for that group need checking. At this stage, the possible arrangements for the group G4 include only A3, as only this arrangement includes group G4. At step 232, the group's arrangements (A3) and the transaction's arrangements (A3) overlap and so the intersection is not an empty set. The transaction's arrangements are substituted with A3.

The next event 170 is now considered at step 206. At step 214, the n-gram generated from events 168, 170 is present in the model as n-gram N3. So the n-gram is not considered as anomalous at this step. At step 222, the group G2, which includes only N3, is not a known group in this transaction. So, the arrangements for that group need checking. At this stage, the possible arrangements for the group G2 include only A1, as only this arrangement includes group G2. At step 232, the group's arrangements (A1) and the transaction's arrangements (A3) do not overlap and so the intersection is an empty set. So the arrangement is considered as anomalous at this step. At step 216, as the arrangement is anomalous, an anomaly is identified and processing finishes at step 218.

Many of the data structures, such as sets of groups and arrangements, may be implemented as simple hash sets of integers to increase processing speed. The relations can be implemented as arrays of integers. Therefore, all the operations after an n-gram has been identified may be array access, hash table look up, hash table addition, and hash table intersection all for integers.

Embodiments of the present invention operate on a small data structure reducing the search scope with each event. Typically an event check involves simple tasks such as hash table look-ups introducing no performance penalty. However, despite the small model and fast operation, the verification may allow for precise matching with few false positives/negatives.

Figure 3:
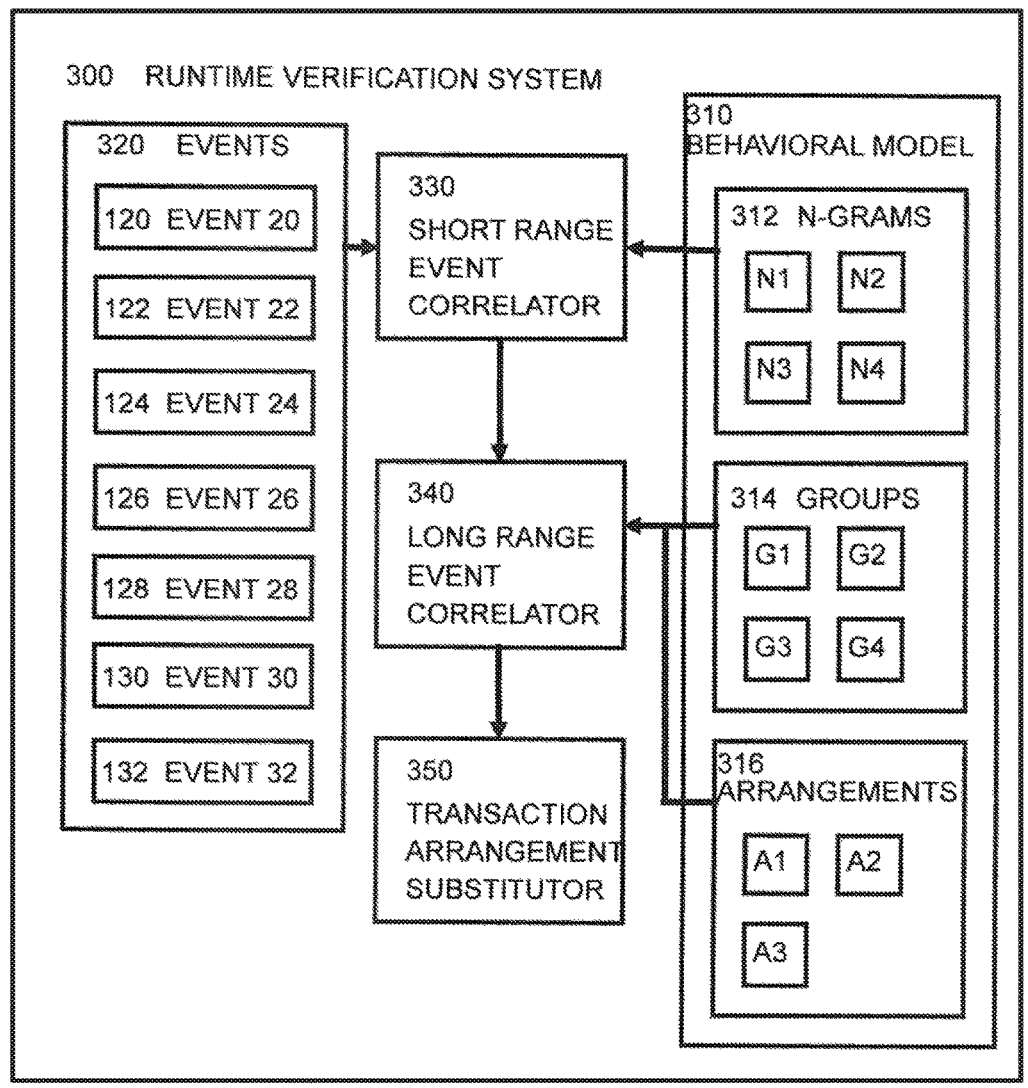
FIG. 3 is a block diagram of a system for runtime verification of software execution against a behavioral model, in accordance with an embodiment of the invention.

FIG. 3 shows a block diagram of a system 300 for runtime verification of software execution against a behavioral model 310, in accordance with an embodiment of the invention. The software execution includes events 320. The system 300 includes behavioral model 310, a short range event correlator 330, a long range correlator 340, and a transaction arrangement substitutor 350.

Behavioral model 310 includes one or more n-grams 312 of acceptable short range correlations of a sequence of two or more events 320, one or more groups 314 of acceptable combinations of n-grams 312, and one or more group arrangements 316 of acceptable combinations of groups 314.

Short range event correlator 330 verifies whether each event 320 is covered by a short range correlation of a sequence of the event 320 and one or more events 320 preceding the event 320 with a sequence of two or more events 320 in the behavioral model 310.

Long range correlator 340 verifies whether each event 320 is covered by a long range correlation of a group 314 of the sequences with a group 314 of the sequences in the behavioral model 310 and verifies whether each event 320 is covered by a long range correlation of an arrangement of groups 314 of the sequences with an arrangement of groups 314 of the sequences in the behavioral model.

Transaction arrangement substitutor 350, after verifying each long range correlation, substitutes the arrangement 316 of groups 314 of the sequences in the behavioral model 310 event 320 with an intersection of an arrangement of groups 314 of the sequences with an arrangement of groups 314 of the sequences in the behavioral model 310.

Figure 4:
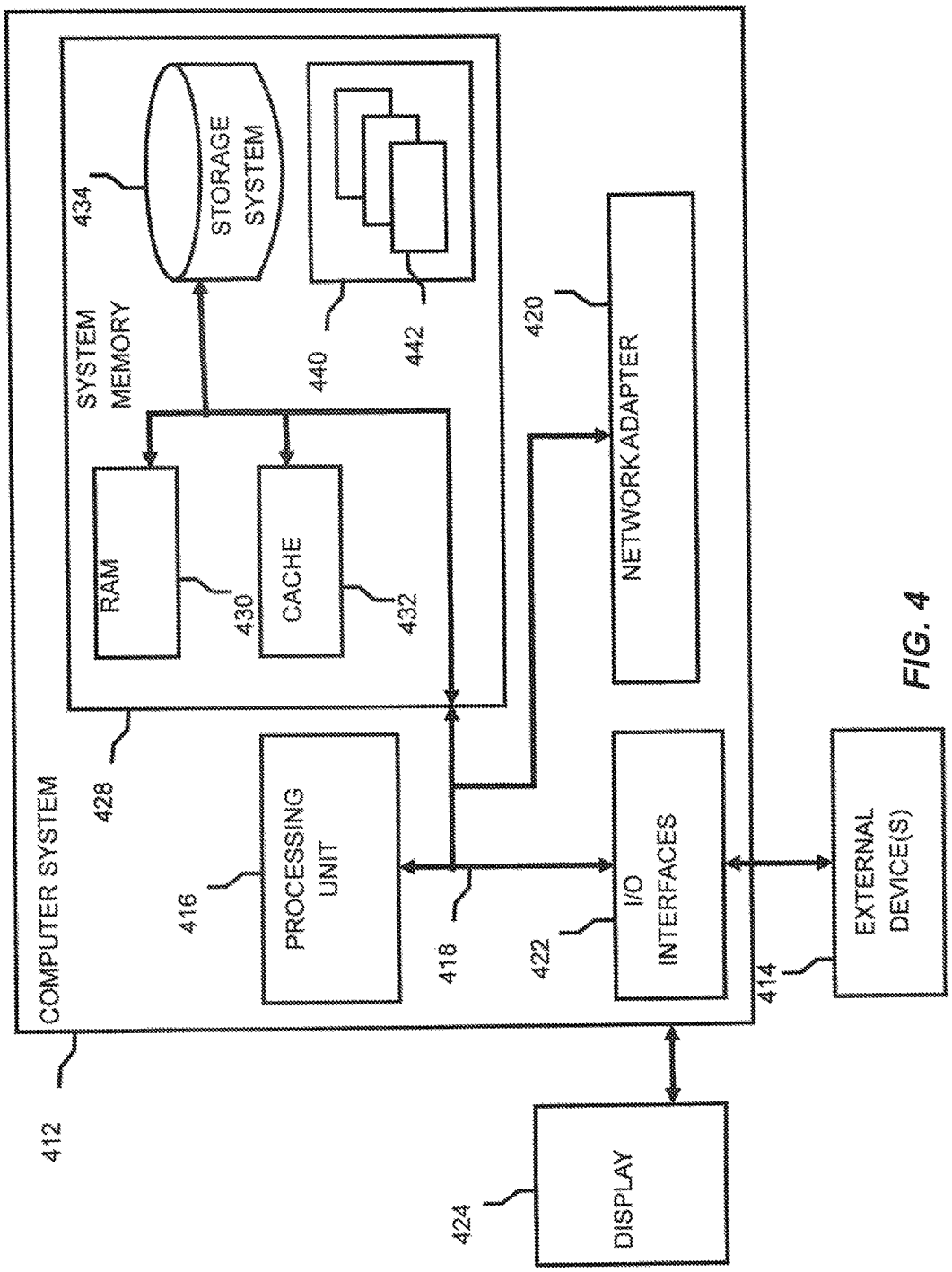
FIG. 4 is a block diagram of a computer system in which embodiments of the present invention may be implemented.

FIG. 4 is a block diagram of a computer system 412 in which embodiments of the present invention may be implemented. Computer system 412 is only one example of a suitable computer system and is not intended to suggest any limitation as to the scope of use or functionality of embodiments of the invention described herein. Regardless, computer system 412 is capable of being implemented and/or performing any of the functionality set forth hereinabove.

Computer system 412 is operational with numerous other general purpose or special purpose computer system environments or configurations. Examples of well-known computer systems, environments, and/or configurations that may be suitable for use with computer system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 412 may be described in the general context of computer system-executable instructions, such as program modules, being executed by a computer system. Generally, program modules may include routines, programs, objects, components, logic, data structures, and so on that perform particular tasks or implement particular abstract data types. Computer system 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system 412 is shown in the form of a general-purpose computing device. The components of computer system 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 412 typically includes a variety of computer system readable media. Such media may be any available media that is accessible by computer system 412, including both volatile and non-volatile media, removable and non-removable media.

System memory 428 can include computer system readable media in the form of volatile memory, such as random access memory (RAM) 430 and/or cache memory 432. Computer system 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system 412 may also communicate with one or more external devices 414 such as a keyboard, a pointing device, a display 424, etc.; one or more devices that enable a user to interact with computer system 412; and/or any devices (e.g., network card, modem, etc.) that enable computer system 412 to communicate with one or more other computing devices. Such communication can occur via Input/Output (I/O) interfaces 422. Still yet, computer system 412 can communicate with one or more networks such as a local area network (LAN), a general wide area network (WAN), and/or a public network (e.g., the Internet) via network adapter 420. As depicted, network adapter 420 communicates with the other components of computer system 412 via bus 418. It should be understood that although not shown, other hardware and/or software components could be used in conjunction with computer system 412. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
 for each event of a software execution comprising events:
  verifying whether the event is covered by a short range correlation of a sequence of the event and one or more events preceding the event with a sequence of two or more events in a behavioral model that comprises one or more n-grams of acceptable short range correlations of a sequence of two or more of the events, one or more groups of acceptable combinations of n-grams, and one or more group arrangements of acceptable combinations of groups;
  verifying whether the event is covered by a long range correlation of a group of the sequences with a group of the sequences in the behavioral model;

verifying whether the event is covered by a long range correlation of an arrangement of groups of the sequences with an arrangement of groups of the sequences in the behavioral model;

after verifying each long range correlation, substituting the arrangement of groups of the sequences in the behavioral model event with an intersection of an arrangement of groups of the sequences with an arrangement of groups of the sequences in the behavioral model; and responsive to the event not being covered by at least one of: the short range correlation, the long range correlation of a group of the sequences, or the long range correlation of an arrangement of groups, indicating that the event is anomalous and halting software execution before execution of the indicated anomalous event.

2. The method of claim 1, wherein the short range correlation of a sequence of events utilizes tri-grams generated from the sequence of events.

3. The method of claim 1, wherein the short range correlation of a sequence of events utilizes tri-grams and bi-grams.

4. A system comprising:

one or more computer processors;

one or more computer-readable storage media;

a system log stored on the one or more computer-readable storage media for recording events generated by a software execution;

a behavioral model, stored on the one or more computer-readable storage media comprising one or more n-grams of acceptable short range correlations of a sequence of two or more events, one or more groups of acceptable combinations of n-grams, and one or more group arrangements of acceptable combinations of groups;

a short range event correlator module, stored on the one or more computer-readable storage media which, when executed by the one or more processors:

verifies whether each event is covered by a short range correlation of a sequence of the event and one or more events preceding the event with a sequence of two or more events in the behavioral model; and responsive to the event not being covered by a short range correlation, indicates that the event is anomalous, and halts software execution before execution of the indicated anomalous event;

a long range correlator module, stored on the one or more computer-readable storage media which, when executed by the one or more processors:

verifies whether each event is covered by one or more of a long range correlation of: a group of the sequences with a group of the sequences in the behavioral model; or an arrangement of groups of the sequences with an arrangement of groups of the sequences in the behavioral model; and responsive to the event not being covered by at least one of the long range correlations, indicates that the event is anomalous, and halts software execution before execution of the indicated anomalous event; and a transaction arrangement substitutor module, stored on the one or more computer-readable storage media which, when executed by the one or more processors, substitutes, after verifying a long range correlation, the arrangement of groups of the sequences in the behavioral model event with an intersection of an arrangement of groups of the sequences with an arrangement of groups of the sequences in the behavioral model.

5. The system of claim 4, wherein the short range correlation of a sequence of events utilizes tri-grams generated from the sequence of events.

6. The system of claim 4, wherein the short range correlation of a sequence of events utilizes tri-grams and bi-grams.

7. A computer program product comprising:

a computer readable storage medium having program instructions embodied therewith, the program instructions executable by a computer to cause the computer to:

for each event of a software execution comprising events:

verify whether the event is covered by a short range correlation of a sequence of the event and one or more events preceding the event with a sequence of two or more events in the behavioral model that comprises one or more n-grams of acceptable short range correlations of a sequence of two or more of the events, one or more groups of acceptable combinations of n-grams, and one or more group arrangements of acceptable combinations of groups;

verify whether the event is covered by a long range correlation of a group of the sequences with a group of the sequences in the behavioral model;

verify whether the event is covered by a long range correlation of an arrangement of groups of the sequences with an arrangement of groups of the sequences in the behavioral model;

after verifying each long range correlation, substituting the arrangement of groups of the sequences in the behavioral model event with an intersection of an arrangement of groups of the sequences with an arrangement of groups of the sequences in the behavioral model; and responsive to the event not being covered by at least one of: the short range correlation, the long range correlation of a group of the sequences, or the long range correlation of an arrangement of groups, indicating that the event is anomalous and halting software execution before execution of the indicated anomalous event.

8. The computer program product of claim 7, wherein the short range correlation of a sequence of events utilizes tri-grams generated from the sequence of events.

9. The computer program product of claim 7, wherein the short range correlation of a sequence of events utilizes tri-grams and bi-grams.

10. A computer system comprising:

one or more computer processors, one or more computer-readable storage media, and program instructions stored on one or more of the computer-readable storage media for execution by at least one of the one or more processors, the stored program instructions comprising:

program instructions, for each event of a software execution comprising events, to:

verify whether the event is covered by a short range correlation of a sequence of the event and one or more events preceding the event with a sequence of two or more events in a behavioral model that comprises one or more n-grams of acceptable short range correlations of a sequence of two or more of the events, one or more groups of acceptable combinations of n-grams, and one or more group arrangements of acceptable combinations of groups;

verify whether the event is covered by a long range correlation of a group of the sequences with a group of the sequences in the behavioral model;

verify whether the event is covered by a long range correlation of an arrangement of groups of the sequences with an arrangement of groups of the sequences in the behavioral model;

after verifying each long range correlation, substituting the arrangement of groups of the sequences in the behavioral model event with an intersection of an arrangement of groups of the sequences with an arrangement of groups of the sequences in the behavioral model; and responsive to the event not being covered by at least one of: the short range correlation, the long range correlation of a group of the sequences, or the long range correlation of an arrangement of groups, indicating that the event is anomalous and halting software execution before execution of the indicated anomalous event.

11. The computer system of claim 10, wherein the stored program instructions for short range correlation of a sequence of events utilize tri-grams generated from the sequence of events.

12. The computer system of claim 10, wherein the stored program instructions for short range correlation of a sequence of events utilize tri-grams and bi-grams.

* * * * *